United States Patent [19]
Cohen

[11] Patent Number: 6,083,094
[45] Date of Patent: Jul. 4, 2000

[54] APPARATUS AND METHOD FOR SLAUGHTERING LARGE DOMESTIC ANIMALS

[76] Inventor: Zachariha Cohen, 1552 Oakwood Dr., Cleveland Heights, Ohio 44121

[21] Appl. No.: 08/878,296

[22] Filed: Jun. 18, 1997

[51] Int. Cl.[7] .................................................... A22B 5/00
[52] U.S. Cl. ................................. 452/54; 55/57; 55/63
[58] Field of Search ............................ 452/63, 52, 54, 452/57, 58, 64, 66, 67, 179, 55

[56] References Cited

U.S. PATENT DOCUMENTS

| | | | |
|---|---|---|---|
| 1,585,807 | 5/1926 | Weinberg | 452/55 |
| 1,701,902 | 2/1929 | Weinberg | 452/55 |
| 1,980,679 | 11/1934 | Graham | 452/55 |
| 2,708,768 | 5/1955 | Baim . | |
| 3,087,195 | 4/1963 | Marshall et al. . | |
| 3,092,871 | 6/1963 | Marshall et al. . | |
| 3,101,508 | 8/1963 | Murphy et al. . | |
| 3,113,340 | 12/1963 | Bush et al. . | |
| 3,115,670 | 12/1963 | Hlavacek et al. . | |
| 3,143,762 | 8/1964 | Murphy . | |
| 3,228,061 | 1/1966 | Hughes | 452/67 |
| 3,237,603 | 3/1966 | Markegard . | |
| 3,324,503 | 6/1967 | St. Clair . | |
| 3,457,585 | 7/1969 | Edison . | |
| 3,572,295 | 3/1971 | Tansel . | |
| 3,967,343 | 7/1976 | Westervelt et al. . | |
| 3,979,792 | 9/1976 | Prince et al. . | |
| 3,997,940 | 12/1976 | Prince et al. . | |
| 4,308,638 | 1/1982 | Senussi . | |
| 4,780,932 | 11/1988 | Bowman et al. . | |

FOREIGN PATENT DOCUMENTS

| | | | |
|---|---|---|---|
| 1531883 | 7/1968 | France | 452/55 |
| 479136 | 7/1929 | Germany | 452/55 |
| 531186 | 8/1931 | Germany | 452/55 |

*Primary Examiner*—Willis Little

[57] ABSTRACT

An apparatus and method for humane slaughtering of animals in accordance with Jewish and Muslim dietary laws with a high degree of reliably, are characterized by an animal enclosure that is mounted to a base for rotation about a longitudinal axis between a normal position and an inverted position. The enclosure has a top, bottom and opposite sides, and one of the opposite sides has a normally closed access opening adjacent the enclosure bottom that may be opened for permitting access to the hooves of the animal when the enclosure is inverted, whereby the animal can be easily shackled after having been inverted, i.e., turned over onto its back. Provision also is made for stretching and holding stretched the neck of the animal during slaughtering, and for laterally restraining the animal when being inverted onto its back, for properly longitudinally positioning the animal in the enclosure prior to inversion, and for allowing ready removal of the slaughtered animal from the enclosure.

10 Claims, 4 Drawing Sheets

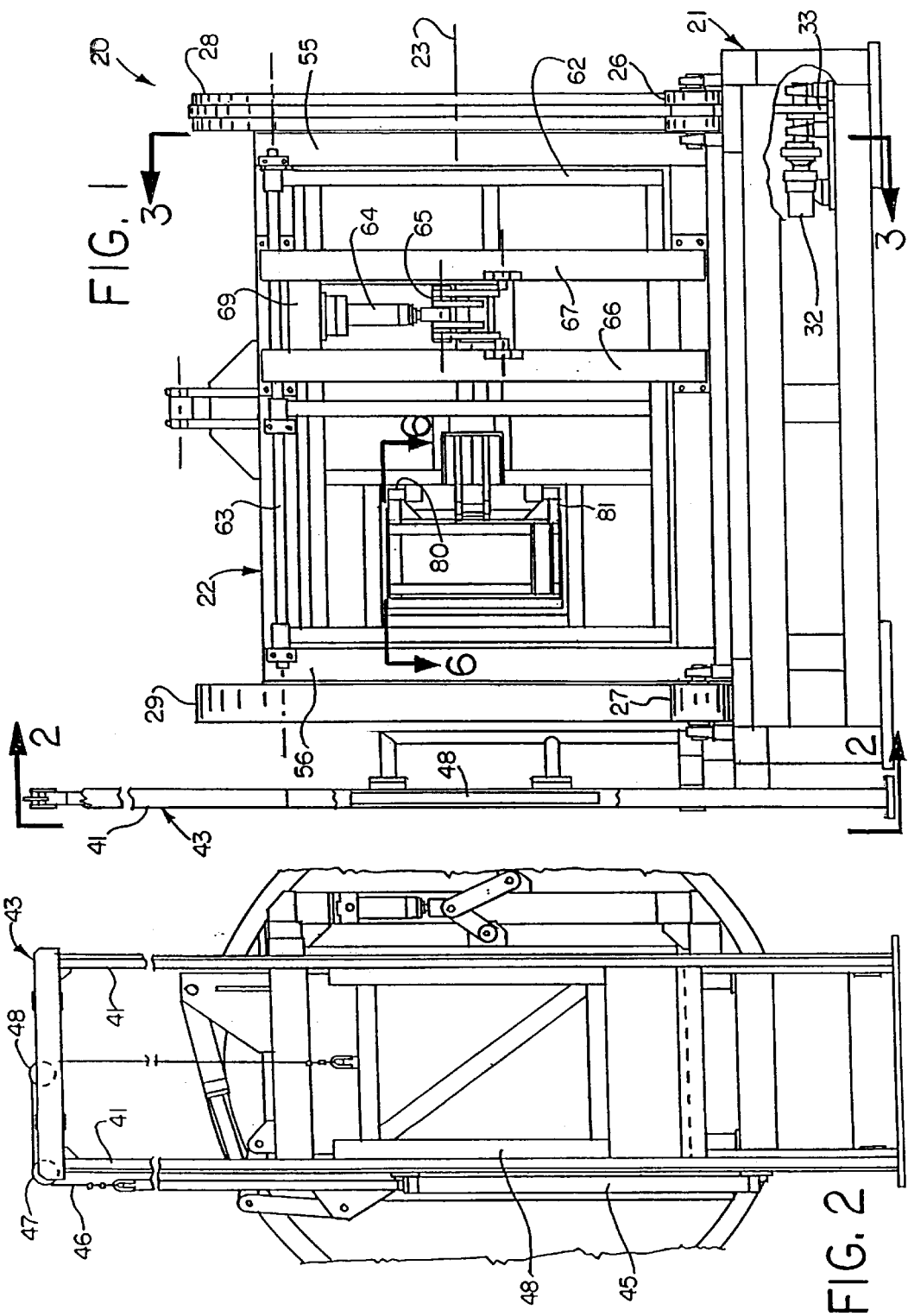

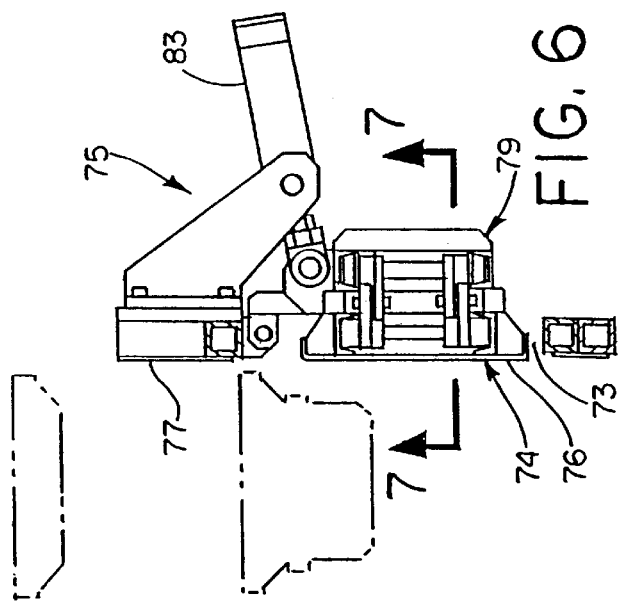
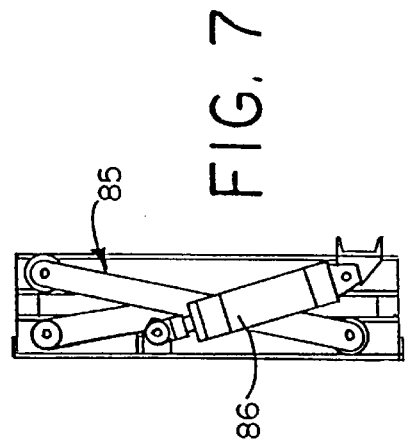
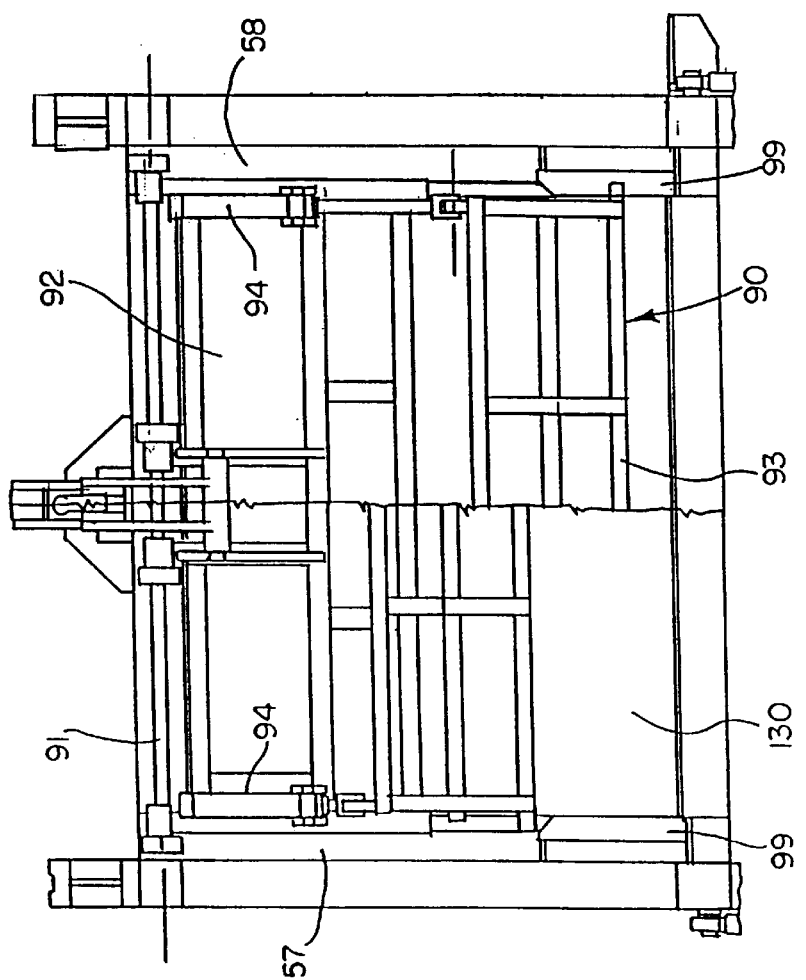

6,083,094

APPARATUS AND METHOD FOR SLAUGHTERING LARGE DOMESTIC ANIMALS

The invention herein described relates generally to the humane slaughtering of animals and more particularly to apparatus and methods for facilitating humane slaughter of large animals in accordance with Jewish and Muslim dietary laws.

BACKGROUND

Various apparatus have been proposed to facilitate the humane slaughter of animals according to Jewish and Muslim dietary laws. By way of example, reference may be had to U.S. Pat. Nos. 3,101,508, 3,324,503 and 4,308,638. As pointed out in these patents, the animal must be slaughtered in a certain way to make sure that the meat is clean.

In accordance with the Jewish ritual of shechita, or kosher slaughtering, the animal must be fully conscious when its throat is cut by a rabbi. The animal must also be oriented such that its body is above its head and throat for full bleeding of the animal before butchering. If the kosher slaughtering procedure is not performed properly, the meat of the slaughtered animal will be rejected as not kosher and typically will be of less value. Because of the difficulties presented by the restraining and handling of large animals such as beef cattle, many slaughtering houses have been plagued by high rejection rates.

Accordingly, a need exists for equipment that will facilitate the humane slaughtering of animals and especially large animals according to Jewish and Muslim dietary laws.

SUMMARY OF THE INVENTION

The present invention provides an apparatus and method for humane slaughtering of animals. Moreover, the apparatus and method enable such slaughter to be performed in accordance with Jewish and Muslim dietary laws with a high degree of reliability, thereby reducing the rejection rate of noncomplying meat.

According to the invention, an apparatus for humane slaughtering of an animal comprises a base and an enclosure for receiving an animal to be slaughtered. The enclosure is mounted to the base for rotation about a longitudinal axis between a normal position and an inverted position for slaughtering. The enclosure has a top, bottom and opposite sides, and one of the opposite sides has an access opening adjacent the bottom for permitting access to the hooves of the animal when the enclosure is inverted, whereby the animal can be easily shackled after having been inverted, i.e., turned over onto its back. This arrangement minimizes the possibility of injury to the operator and animal during the shackling operation.

In accordance with a preferred embodiment of the invention, the side of the enclosure with the access opening includes a side panel that is movable between a closed position restraining the animal in the enclosure and an open position permitting removal of the animal from the enclosure. The side panel includes a panel section and a gate section, the latter being movable relative to the former to vary the size of the access opening. The gate and panel sections are parallel to one another, and the gate section is mounted to the panel section for movement parallel to the panel section towards and away from the bottom of the enclosure when the side panel is in its closed position. The side panel preferably is mounted for pivotal movement about a longitudinal axis parallel to the longitudinal axis of the enclosure whereby the side panel may be swung open and closed. When swung open the side panel forms an extension of a top wall at the top of the enclosure onto which the slaughtered animal may slide to facilitate hoisting of the animal away from the enclosure. The opposite side of the enclosure preferably includes a panel mounted for movement into the interior compartment of the enclosure to engage and laterally restrain the animal and further to facilitate removal of the animal from the enclosure after slaughtering.

According to another aspect of the invention, there is provided a pusher member for engaging the rear end of the animal, and a mechanism for moving the pusher member from an ambush position allowing the animal to pass by the pusher member into the enclosure to a position behind the animal and then forwardly to urge the animal forwardly in the enclosure. Preferably, one of the sides of the enclosure includes a side panel having a planar extent, and the pusher member when in its ambush position resides in the plane of the side panel. Also, among other things, the other side may have the aforesaid access opening adjacent the bottom of the enclosure for permitting access to the hooves of the animal when the enclosure is inverted.

According to a further aspect of the invention, there is provided a neck yoke at one end of the enclosure and means for moving the neck yoke towards and away from the top of the enclosure. Preferably a neck stretcher member is mounted to the neck yoke for pivotal movement to effect rotation of the animal's head for stretching and holding stretched the animal's neck prior to and during slaughtering, i.e., cutting of the animal's throat.

Further in accordance with the invention, there is provided a method for humane slaughtering of an animal that, generally, comprises the steps of positioning an animal to be slaughtered in an enclosure having a top, bottom and opposite sides, rotating the enclosure about a longitudinal axis thereof to invert the animal such that the back of the animal rests on the top of the enclosure with its legs extending upwardly, attaching a shackle to at least one of the rear legs of the animal when inverted, cutting the throat of the animal, opening a side of the inverted enclosure after the animal has been shackled and its throat cut, and then removing the animal through the open side of the enclosure with the animal being hoisted by its shackled leg or legs.

As is preferred, the attaching step includes opening an access opening at a side of the enclosure to gain access to the rear legs of the animal. As is also preferred, the method further comprises the step of using a chin bar to rotate the head of the animal after it has been inverted to stretch and hold stretched the neck of the animal for cutting of its throat; the step of moving the panels at the sides of the enclosure relatively towards one another to closely laterally restrain the animal prior to and during rotation of the enclosure; and the step of moving a pusher member behind the animal after it has been positioned in the enclosure and then moving the pusher member forwardly to urge the animal forwardly in the enclosure prior to inversion of the enclosure. The opening step preferably includes rotating a side panel from a vertical orientation to a generally horizontal orientation to form a continuation of a top wall of the enclosure upon which the slaughtered animal may slide onto to facilitate hoisting of the animal away from the enclosure.

The foregoing and other features of the invention are hereinafter fully described and particularly pointed out in the claims, the following description and the annexed drawings setting forth in detail a certain illustrative embodiment of the invention, this being indicative, however of but one of the various ways in which the principles of the invention may be employed.

BRIEF DESCRIPTION OF THE DRAWINGS

FIG. 1 is a side elevational view, partly broken away, of a slaughtering apparatus according to the invention.

FIG. 2 is a rear end elevational view of the slaughtering apparatus of FIG. 1, looking from the line 2—2 of FIG. 1.

FIG. 5 is an elevational view of the side of the apparatus opposite that shown in FIG. 1, with a hoof access gate shown open at the left and closed at the right.

FIG. 6 is a top plan view of a pusher mechanism mounted to a side of the rotatable housing.

FIG. 7 is a sectional view of the pusher mechanism of FIG. 6 taken along the line 6—6 thereof.

DETAILED DESCRIPTION

Figure 3:
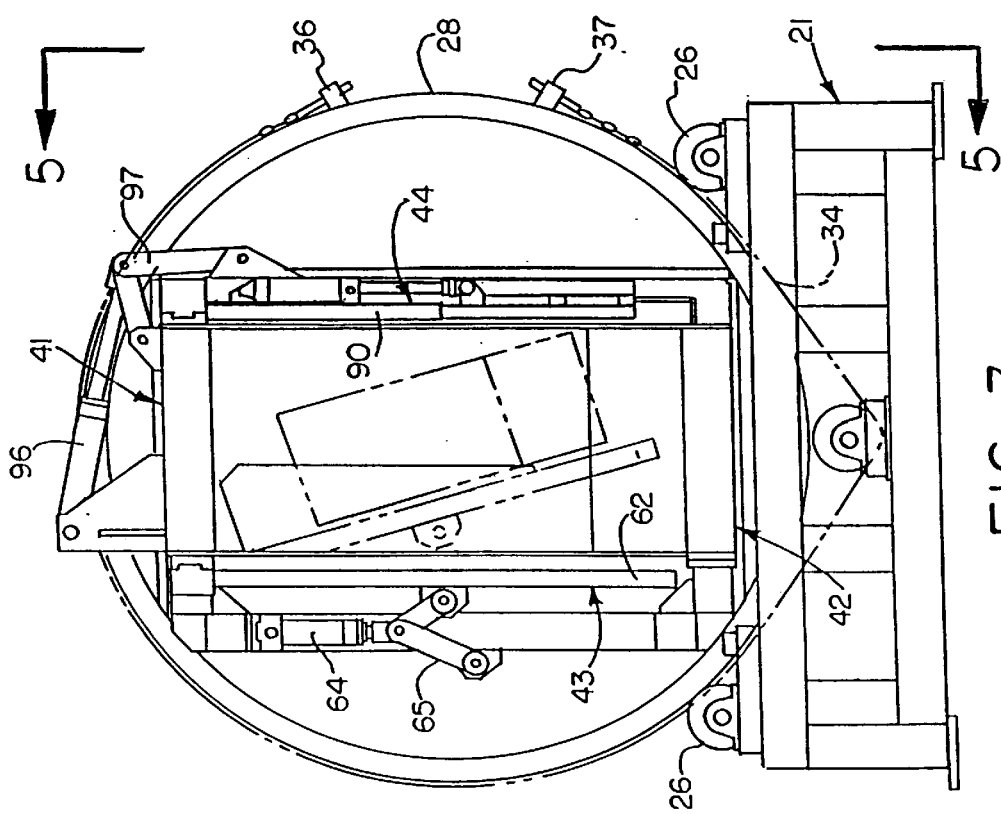
FIG. 3 is a front end elevational view of the rotatable housing of the slaughtering apparatus, looking from the line 3—3 of FIG. 1.

Referring now in detail to the drawings and initially to FIGS. 1–3, a slaughtering apparatus according to the invention is illustrated generally at 20. The apparatus 20 comprises a base 21 and a housing 22 that is mounted on the base for rotation about a horizontal axis 23. The base 21 is in the form of a fabricated frame, but other base structures may be employed as desired. For example, the components of the base 21 that support the housing may be mounted directly to a floor or platform structure, if desired. Although less preferred, the base structure may be suspended from a ceiling or from nearby walls of a building or other structure, it being understood that the base structure is that structure which supports the housing 22 so that it may be inverted. Preferably such inversion is effected by rotating the housing about its longitudinal axis, as in the manner hereinafter described.

In the illustrated embodiment the base 21 forms a cradle in which the housing 22 is cradled for rotation about its longitudinal axis 23 which preferably is horizontally disposed as shown. At its front and rear ends, the base includes respective pairs of laterally spaced apart rollers 26 and 27 which support respective rotation rings 28 and 29 at the front and rear ends of the housing. The rollers 26 at the front of the housing are grooved to receive a correspondingly sized annular rib on the front rotation ring 28 to fix the axial position of the front rotation ring relative to the base 21. The other rollers 27 and rear rotation ring 29 preferably are rib and groove free so as to accommodate any dimensional differences in the axial spacing between the rotation rings and the axial spacing between the front and rear pairs of rollers. In an alternative embodiment, the ribbed ring and grooved rollers may be at the rear and the rib-free ring and groove-free roller at the front.

In general, the housing 22 may be rotated between upright (FIG. 3) and inverted (FIG. 4) positions by any suitable means including even manually. Preferably powered drive means with appropriate controls are provided to rotate the housing. In the illustrated embodiment a reversible drive motor 32 is mounted in the base 21. The drive motor operates to rotate a drive sprocket 33 over which a drive chain 34 is trained. As shown in FIG. 3, the drive chain 34 is wrapped around the front rotation ring 28 and has opposite ends fixed to the front rotation ring at anchors 36 and 37. Accordingly, the motor can be operated to drive the sprocket 33 in opposite directions thereby to rotate the front rotation ring, and consequently the housing 22, in opposite directions. In an alternative embodiment, the drive motor may be located at the rear of the apparatus and connected by the chain to the rear rotation ring. Suitable sensors, such as trip switches, may be provided to sense the normal and inverted positions of the housing. Also, a lock mechanism may be provided to lock the housing in its normal and inverted positions when not being rotated. The lock mechanism may include, for example, a hydraulically actuated pin carried on the housing that may be extended into a bore in a lock member fixed to the base when aligned therewith.

The housing 22 includes an animal enclosure or cage 40 supported at its front and rear ends by the rotation rings 28 and 29. The animal enclosure has a top 41, bottom 42 and sides 43 and 44 that define an interior compartment 45. At the front end of the compartment there is provided a neck yoke and stretching mechanism that is described in detail below with particular reference to FIGS. 8 and 9. The rear end of the compartment 45 is open to provide for entry therein of an animal to be slaughtered.

As seen in FIGS. 1 and 2, the bottom 42 of the animal enclosure is elevated above floor level by the base 21. As it is desirable for an animal to walk under its own power into the animal enclosure 40, a ramp (not shown) may be provided at the rear end of the apparatus. As an alternative, the base 21 may housed in a pit with the bottom 42 of the animal enclosure disposed at the level of the floor, in which case a ramp would be unnecessary. Other arrangements may also be employed.

To retain an animal in the animal enclosure 40, a gate 48 is provided to the rear of the rear rotation ring 29. The gate is guided for vertical movement by a pair of upright guide tracks 41 of a track assembly 43 that is supported on the floor and attached to the base 21. The upright guide tracks 41 straddle an entryway through which the animals will pass into the animal enclosure 40. The gate is movable between a lowered position blocking the entryway and a raised position permitting passage of an animal therebeneath. Once an animal has been loaded into the animal enclosure the gate can be lowered to prevent the animal from backing out of the enclosure.

In the illustrated embodiment, raising and lowering of the gate 48 is effected by extension and retraction of a gate actuator 45 in the form of a hydraulic or pneumatic piston-cylinder assembly 45 mounted to the side of one of the upright guide tracks 41 and connected to the gate by a cable 46 trained over pulleys 47 and 48 provided at the top of the track assembly 43. In general, other suitable means may be employed to raise and lower the gate, and other types of gates, actuators and associated structure may be used to block passage of an animal out of the animal enclosure after it has moved into the enclosure.

Turning now to the construction of the animal enclosure 40 according to the illustrated preferred embodiment of the invention, the bottom 42 is formed by a bottom wall or floor structure 50 that may be fabricated from frame elements covered by a skin, such as a sheet metal skin, to provide a smooth continuous bottom (floor) surface. Similarly, the top 41 is formed by a fabricated top wall structure 53. Preferably, for sanitary purposes, the bottom and top walls 50 and 53 are made of stainless steel as are the other components of the apparatus 20 that come into contact with the animal or animal fluids during loading, slaughtering and removal of the animal.

The bottom and top walls 50 and 53, which are rectangular in shape, are joined together at corresponding corners thereof by upright corner posts 55–58. Together the bottom wall, top wall and upright corner posts form a box-like frame to which the rotation rings 28 and 29 are fixed for common rotation.

The side 43 of the animal enclosure 40 includes a pusher panel 62 that is mounted for pivotal movement by a pivot shaft 63 extending between upper ends of the adjacent upright corner posts 55 and 56. Like the top and bottom walls, the pusher panel 62 may be fabricated from frame elements covered on their interior (compartment) side with a sheet metal skin providing a smooth interior side surface. The pusher panel is swung inwardly and outwardly by a side panel actuator 64 in the form of a piston-cylinder assembly that extends and retracts a toggle joint 65. The toggle joint is connected between the pusher panel and an extension of the box frame formed by upright supports 66 and 67 joined top and bottom by offset arms to the top and bottom walls. The piston-cylinder assembly 64 has the blind end of it cylinder pivotally connected to a cross member 69 connected between the upright supports and its piston rod connected to the toggle joint 65 at the pivot connection between the toggle links. Other suitable powered means including manual means may be used to operate the toggle joint, if desired. Moreover, other types of mechanisms may be used to swing the pusher panel in the manner hereinafter described.

The pusher panel 62 has near its rear edge an opening 73 in which a pusher member 74 of a pusher mechanism 75 is normally located in an ambush position preferably with its planar pusher surface 76 flush with the interior surface 77 of the pusher panel 62 as shown in FIG. 6. The pusher mechanism further includes a swing arm 79 that is connected by top and bottom pivots 80 and 81 to the pusher panel adjacent the forward edge of the opening 73. The swing arm 79 is swung inwardly from its ambush position to a position located within the compartment 45 by a swing arm actuator 83 in the form of a piston-cylinder assembly that is connected between the swing arm 79 and brackets mounted to the pusher panel.

The pusher member 74 is connected to the swing arm 79 by a scissor extension mechanism 85. The scissor extension mechanism is extended and retracted by a pusher member extender actuator 86 in the form of a piston-cylinder assembly connected between the swing arm 79 and the pusher member 74.

After an animal is moved into the compartment 45 forwardly of the ambush position of the pusher member 74, the swing arm actuator 83 is extended to swing the swing arm 79 into the compartment to position the pusher member 74 behind the animal and perpendicular to the longitudinal axis 23 of the animal enclosure. The pusher member extender actuator 86 may then be extended to extend the pusher member forwardly while maintaining its pusher surface 76 perpendicular to the longitudinal axis of the animal enclosure. As the pusher member moves forwardly it will push the animal forwardly properly to locate the animal forwardly in the compartment. In reverse manner the pusher member may be retracted rearwardly and then swung back to its ambush position at one side of the compartment to permit entry of an animal into the compartment.

The illustrated swing arm 79 and scissor extension mechanism 85 are preferred devices for effecting the described movement of the pusher member. However, other means may be employed to provide for the described or equivalent movement of pusher member and such means are intended to be encompassed by the herein described invention. It also is noted that preferably the pusher member should be of sufficient size and located to engage the rump of the animals, such as beef cattle, to be slaughtered in the apparatus.

The side 44 of the animal enclosure 40 is formed by a telescoping swing panel 90 that is mounted for pivotal movement by a pivot shaft 91 extending between upper ends of the adjacent upright corner posts 57 and 58. The telescoping swing panel has an upper panel section 92 and a lower gate section 93 that telescopes into and out of the panel section 92. The panel and gate sections each may be fabricated from frame elements covered on their interior (compartment) side with a skin providing a smooth side surface. The gate section 93 is telescopically extended and retracted by gate actuators 94 in the form of piston-cylinder assemblies that are connected between the sections at front and rear ends thereof.

Figure 4:
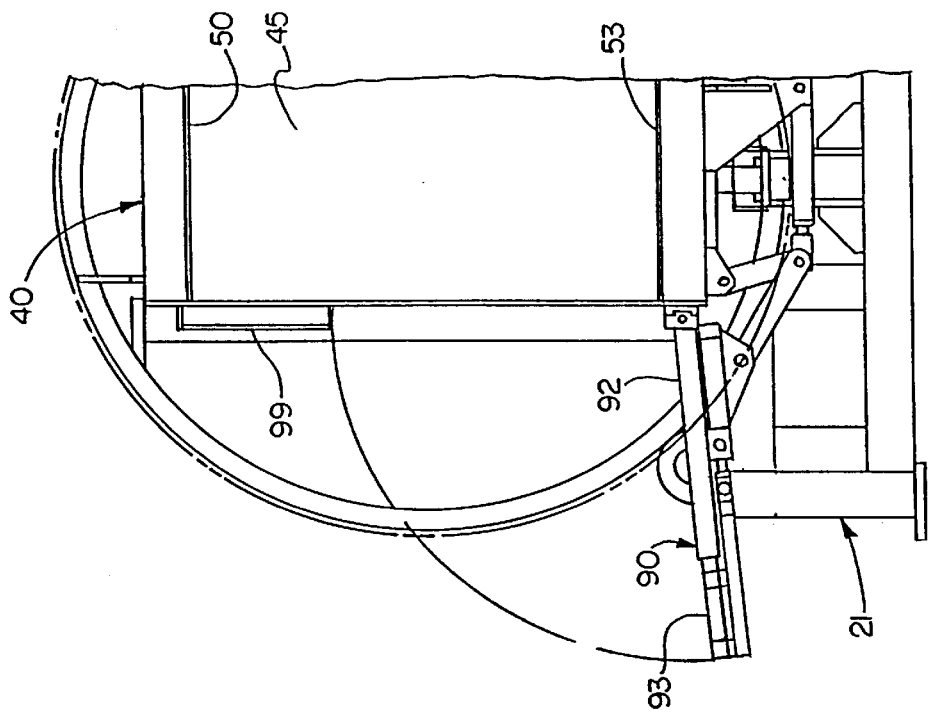
FIG. 4 is a view similar to FIG. 3, but showing the rotatable housing after inversion and with one side thereof opened for removal of a slaughtered animal from the housing.

The swing panel 90 is swung outwardly and back by a swing panel actuator 96 in the form of a piston-cylinder assembly that extends and retracts a linkage mechanism 97. The linkage mechanism is connected between the swing panel 90 and the upper wall 53 as shown in FIGS. 3 and 4, it being noted that in FIG. 4 the animal enclosure has been rotated 90° such that the top wall 53 is located beneath the bottom wall 50. When the swing panel is swung to its closed position and extended as shown in FIG. 3, the distal end of the telescoping gate panel is captured in channels 99 attached to the enclosure.

Figure 8:
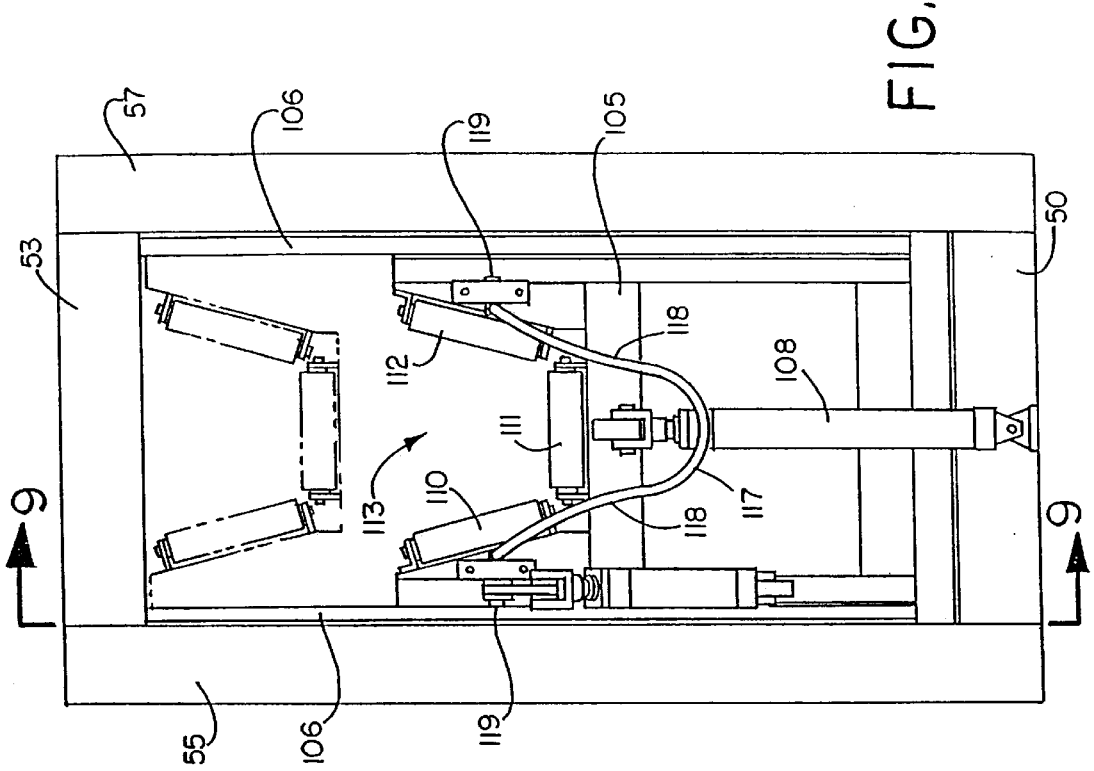
FIG. 8 is a front elevational view of a neck yoke and stretcher mechanism at the front end of the rotatable housing.
Figure 9:
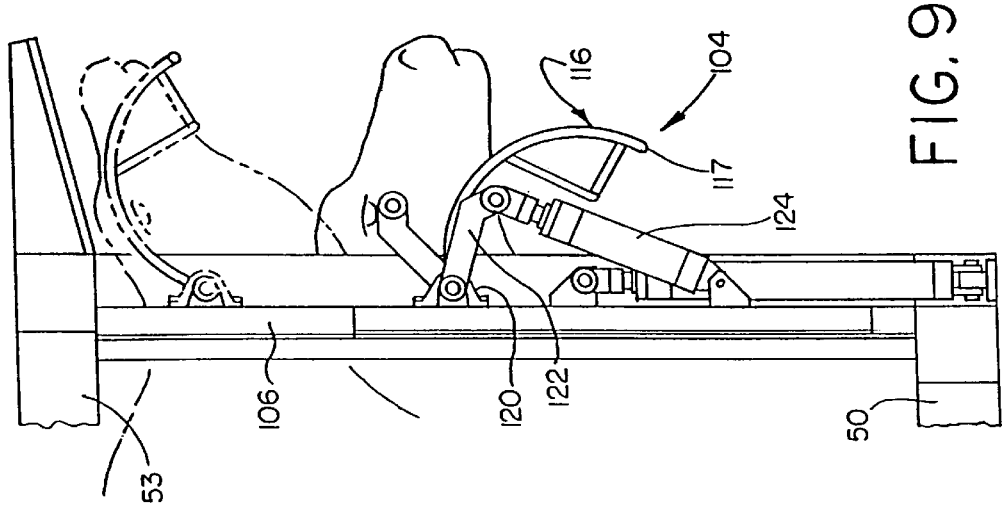
FIG. 9 is a side elevational view of the neck yoke and stretcher mechanism of FIG. 8 taken along the line 9—9 thereof.

Referring now to FIGS. 8 and 9, the above mentioned neck yoke and stretcher mechanism is indicated generally at 104. The neck yoke and stretcher mechanism includes a carriage 105 that is guided at is side edges for vertical movement by vertical tracks 106. The tracks extend between the top and bottom walls 50 and 53 inwardly adjacent the upright posts 55 and 57 as shown in FIG. 8. The carriage is raised and lowered by a carriage actuator 108 in the form of a hydraulic or pneumatic piston-cylinder assembly that is connected between the carriage and the bottom wall of the animal enclosure.

The carriage 105 has mounted thereon three rollers 110–112 arranged to form an upwardly opening yoke 1 13 having a truncated V-shape. In an alternative embodiment, the yoke may be formed by a plate having a truncated V-shape aperture with the side edges thereof corresponding to the respective positions of the rollers. The size of the yoke preferably is such that it will loosely accommodate the neck of the animal to be slaughtered. If desired, provision may be made for adjusting the size of the yoke by moving the rollers away or towards one another.

The mechanism 104 also includes a neck stretcher 116. The neck stretcher generally has a U-shape with the base 117 thereof forming a chin bar and the legs 118 diverging away from one another for pivotal connection at their ends to stub shafts 119 that are journalled in pillow blocks 120 mounted to the carriage. One of the stub shafts has connected thereto a crank arm 122 to which one end of a piston-cylinder assembly 124 is pivotally connected. The other end of the piston-cylinder assembly, which functions as a neck stretcher actuator, is pivotally connected to the carriage such that extension and retraction of the piston-cylinder assembly will swing the chin bar upwardly and downwardly. In an alternative embodiment, the crank arm may be replaced by a gear in mesh with a rack moved back and forth by the piston-cylinder assembly.

In the operation of the apparatus according to the method of the invention, initially an animal to be slaughtered is driven into the compartment 45 after which the gate 48 is lowered to prevent the animal from escaping from the compartment. The animal is driven forwardly sufficiently to locate its rear end forward of the pusher member 74 and preferably with its head projecting forwardly beyond the yoke 113 with its neck cradled in the yoke 113 then disposed at its lowered position shown in solid lines in FIG. 8. At this point the pusher member 74 is swung behind the animal and then extended forwardly to either move the animal into the thus mentioned position or to hold the animal in such position.

With the animal now restrained against any significant longitudinal movement, the pusher panel 62 is swung inwardly to its phantom line position shown in FIG. 3 gently to squeeze the belly of the animal between the pusher panel and the swing panel assembly 90. Now the animal will be both longitudinally and laterally restrained or confined against any significant movement.

Next the animal enclosure 40 is slowly rotated to turn the enclosure bottom side up thereby inverting the animal. In the illustrated embodiment rotation is counter-clockwise in FIG. 3 so that the animal will first lay on its side against the inclined pusher wall 62 after which, upon further rotation of the enclosure, the animal will slide down the pusher wall until its back comes to rest against the top wall 53. Although one might expect the animal to be frantic when turned upside down, it has been found that beef cattle become somewhat docile when resting on their backs within the confines of the enclosure. The pusher wall may be provided with a relatively inclined ramp 127 (FIG. 3) near its front end to guide and support the neck of the animal as it slides down the pusher wall.

Now with the animal inverted, the yoke 113 is moved towards the top wall 53 of the enclosure 40 as shown in broken lines in FIG. 8 to closely cradle the animal's neck which had moved away from the yoke when turned over by rotation of the enclosure. Next the chin bar 117 is relatively raised, i.e., moved toward the top wall, to catch the chin of the animal and move its head toward the top wall thereby stretching its neck as shown in broken lines in FIG. 7. This exposes the throat of the animal for being cut. Also, the animal's head will be restrained to prevent any significant movement as the animal's throat is be cut so as to ensure that the cut is made in accordance with ritualistic dietary laws that require the cut to be made without the animal forcibly bearing against the knife as might occur if the animal were free to jerk towards the knife as the cut is being made.

Before or after the animal's throat is cut, the gate 93 of the swing panel assembly 90 is retracted to provide an access opening 130 (FIG. 5) to permit shackling of one or both rear legs of the animal for connection to a hoist disposed above the apparatus. Because the animal is restrained and on its back, shackling can be done much easier and safer than if the animal were standing. With the animal shackled and the animal's throat cut, the swing panel assembly is swung outwardly to its position shown in FIG. 4 to form an extension of the top wall 53. This allows the animal to slide out of the enclosure and onto the swing panel assembly. The animal can then be hoisted by its rear leg or legs while the blood continues to drain from the animal, suitable means such as a catch basin being provided beneath the animal enclosure to catch the blood. After or while blood continues to drain from the animal, the animal may be moved clear of the apparatus so that the apparatus may be readied for slaughtering of a next animal.

In the above described embodiment of the invention, various moving components are powered by piston-cylinder assemblies. As will be appreciated by those skilled in the art, other means may be employed to move these components such that the components can effectuate their herein described function and purpose, and the invention is broadly intended to encompass such other means that implement the function of the component that they replace. Similarly, any component herein described may be replaced by other means that implements the stated function of that component.

Although the invention has been shown and described with respect to a preferred embodiment, it will be apparent that equivalent alterations and modifications will occur to others skilled in the art upon the reading and understanding of this specification. The present invention includes all such equivalent alterations and modifications, and is limited only by the scope of the following claims.

What is claimed is:

1. An apparatus for humane slaughtering of an animal, comprising a base, and an enclosure for receiving an animal to be slaughtered, said enclosure being mounted to said base for rotation about a longitudinal axis between a normal position and an inverted position, said enclosure having a top, bottom and opposite sides, one of said opposite sides having an access opening adjacent said bottom for permitting access to the hooves of the animal when the enclosure is inverted;

wherein one of said opposite sides includes a side panel movable between a closed position restraining the animal in the enclosure and an open position permitting removal of the animal from the enclosure;

wherein said side panel includes a panel section and a gate section, said gate section being movable relative to said panel section to vary the size of said access opening;

wherein said gate and panel sections are parallel to one another, and said gate section is mounted to said panel section for movement parallel to said panel section towards and away from said bottom when said side panel is in its closed position.

2. An apparatus for humane slaughtering of an animal, comprising a base, an enclosure for receiving an animal to be slaughtered, said enclosure being mounted to said base for rotation about a longitudinal axis between a normal position and an inverted position, said enclosure having a top, bottom and opposite sides, a pusher member for engaging the rear end of the animal and a mechanism for moving said pusher member from an ambush position allowing the animal to pass by the pusher member into said enclosure to a position behind the animal and then forwardly to urge the animal forwardly in the enclosure;

wherein one of said opposite sides of the enclosure includes a side panel having a planar extent, and said pusher member when in its ambush position resides in the plane of said side panel.

3. An apparatus as set forth in claim 2, wherein the other of said opposite sides has an access opening adjacent said bottom of said enclosure for permitting access to the hooves of the animal when said enclosure is inverted.

4. An apparatus for humane slaughtering of an animal, comprising a base, an enclosure for receiving the animal to be slaughtered, and a neck stretcher member;

said enclosure being mounted to said base for rotation about a longitudinal axis between a normal position and an inverted position, said enclosure having top, bottom and opposite sides, a neck yoke at one end of said enclosure, and means for moving said neck yoke towards and away from said top of said enclosure;

said neck stretcher member being mounted to said neck yoke for pivotal movement.

5. A method for humane slaughtering of an animal, comprising the steps of positioning an animal to be slaughtered in an enclosure having a top, bottom and opposite sides, rotating said enclosure about a longitudinal axis thereof to invert the animal such that the back of the animal rests on the top of the enclosure with its legs extending upwardly, attaching a shackle to at least one of the rear legs of the animal when inverted, cutting the throat of the animal, opening a side of the inverted enclosure after the animal has been shackled and its throat cut, and then removing the animal through the open side of the enclosure with the animal being hoisted by its shackled leg or legs.

6. A method as set forth in claim 5, wherein said attaching step includes opening an access opening at a side of the enclosure to gain access to the rear hooves of the animal.

7. A method as set forth in claim 5, comprising the step of using a chin bar to rotate the head of the animal after it has been inverted to stretch and hold stretched the neck of the animal for cutting of its throat.

8. A method as set forth in claim 5, comprising the step of moving the panels at the sides of the enclosure relatively towards one another to closely laterally restrain the animal prior to and during rotation of the enclosure.

9. A method as set forth in claim 5, comprising the step of moving a pusher member behind the animal after it has been positioned in the enclosure and then moving the pusher member forwardly to urge the animal forwardly in the enclosure prior to inversion of the enclosure.

10. A method as set forth in claim 5, wherein said opening step includes rotating a side panel from a vertical orientation to a generally horizontal orientation to form a continuation of the top of the enclosure upon which the slaughtered animal may slide onto to facilitate hoisting of the animal away from the enclosure.

* * * * *